(12) United States Patent
Nishikawa et al.

(10) Patent No.: US 11,411,277 B2
(45) Date of Patent: Aug. 9, 2022

(54) BATTERY PACK, POWER TOOL, AND BATTERY PACK AND POWER TOOL SET

(71) Applicant: Koki Holdings Co., Ltd., Tokyo (JP)

(72) Inventors: Tomomasa Nishikawa, Ibaraki (JP); Satoru Matsuno, Ibaraki (JP); Mitsutaka Sakamoto, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 515 days.

(21) Appl. No.: 16/095,945

(22) PCT Filed: Mar. 31, 2017

(86) PCT No.: PCT/JP2017/013667
§ 371 (c)(1),
(2) Date: Oct. 24, 2018

(87) PCT Pub. No.: WO2017/187889
PCT Pub. Date: Nov. 2, 2017

(65) Prior Publication Data
US 2019/0148687 A1    May 16, 2019

(30) Foreign Application Priority Data

Apr. 26, 2016 (JP) .............................. JP2016-088299

(51) Int. Cl.
*H01M 2/10* (2006.01)
*H01M 50/213* (2021.01)
(Continued)

(52) U.S. Cl.
CPC ............. *H01M 50/213* (2021.01); *B25F 5/02* (2013.01); *B23D 45/16* (2013.01); *B25B 21/00* (2013.01); *H01M 2220/30* (2013.01)

(58) Field of Classification Search
CPC ........................ H01M 2/1055; H01M 2220/30
See application file for complete search history.

(56) References Cited

U.S. PATENT DOCUMENTS 7,443,137 B2 * 10/2008 Scott .................... H01M 50/20
320/114
2015/0214520 A1 * 7/2015 Nishikawa ................ B25F 5/02
429/100

FOREIGN PATENT DOCUMENTS

JP    2003282041    10/2003
JP    2006313736    11/2006
(Continued)

OTHER PUBLICATIONS

JP2013111673A Kamijo et al. translation (Year: 2013).*
(Continued)

*Primary Examiner* — Jane J Rhee
(74) *Attorney, Agent, or Firm* — JCIPRNET

(57) ABSTRACT

The purpose of the invention is to provide a battery pack and a power tool on which the same can be detachably mounted such that compatibility can be ensured even if the dimensions of the battery cells therefor are changed, as well as a battery pack and power tool set. A second battery pack is provided with second battery cells, a second case which houses the second battery cells, a second latch portion for mounting the second battery pack to the power tool, and a second latch operating portion. The second battery pack has a larger case width than that of a specified battery pack for housing battery cells shorter than the second battery cells. However, as the rail width is the same, the second battery pack can be detachably mounted to the power tool in place of the specified battery pack.

13 Claims, 6 Drawing Sheets

(51) Int. Cl.
*B25F 5/02* (2006.01)
*B23D 45/16* (2006.01)
*B25B 21/00* (2006.01)

(56) References Cited

FOREIGN PATENT DOCUMENTS

| | | |
|---|---|---|
| JP | 2007123082 | 5/2007 |
| JP | 2012035398 | 2/2012 |
| JP | 2012049074 | 3/2012 |
| JP | 2013111673 | 6/2013 |

OTHER PUBLICATIONS

"Office Action of Japan Counterpart Application", dated Jun. 4, 2019, with English translation thereof, p. 1-p. 10.
"International Search Report (Form PCT/ISA/210) of PCT/JP2017/013667," dated May 16, 2017, with English translation thereof, pp. 1-4.
"Office Action of Japan Counterpart Application," with English translation thereof, dated Oct. 29, 2019, p. 1-p. 8.

* cited by examiner

10 FIRST BATTERY PACK

20 SECOND BATTERY PACK

1' POWER TOOL (PORTABLE CUTTING MACHINE)

BATTERY PACK, POWER TOOL, AND BATTERY PACK AND POWER TOOL SET

CROSS-REFERENCE TO RELATED APPLICATION

This application is a 371 application of the international PCT application serial no. PCT/JP2017/013667, filed on Mar. 31, 2017, which claims the priority benefit of Japan application no. 2016-088299, filed on Apr. 26, 2016. The entirety of each of the above-mentioned patent applications is hereby incorporated by reference herein and made a part of this specification.

TECHNICAL FIELD

The present invention relates to a battery pack, a power tool on which the battery pack can be detachably mounted, and a battery pack and power tool set.

BACKGROUND ART

Recently, it has been desired to increase an output of a battery pack, and there is a trend to increase an output of battery cells built into a battery pack. Conventionally, a 18650 size having a diameter of 18 mm and a length of 65 mm is mainstream for a battery cell, but a battery cell having a diameter of 20 mm has also been developed to achieve high output (Patent Literature 1 below).

CITATION LIST

Patent Literature

[Patent Literature 1]
Japanese Unexamined Patent Application Publication No. 2006-313736

SUMMARY OF INVENTION

Technical Problem

If the dimensions of battery cells are different, the dimensions of a battery pack into which the battery cells are built also differ. When a high power type battery pack (hereinafter, also referred to as "new battery pack") cannot be connected to a power tool driven by a conventional battery pack (hereinafter, also referred to as "old battery pack"), that is, when there is no compatibility, it is necessary for a user to newly provide a power tool corresponding to the new battery pack, and this will increase a burden on the user. In addition, it is feared that handling may become difficult as the battery cell becomes larger.

The present invention has been made in recognition of such a situation, and a first objective thereof is to provide a battery pack capable of ensuring compatibility even when dimensions of a built-in battery cell are changed, and a power tool on which the battery pack can be detachably mounted, and a battery pack and power tool set.

A second objective thereof is to provide a battery pack capable of being easily handled even when a size of the battery pack is increased, and a power tool on which the battery pack can be detachably mounted.

A third objective thereof is to provide a battery pack capable of minimizing a risk of damage to a latch operating portion as compared with a conventional battery pack due to an increased size of the battery pack, and a power tool on which the battery pack can be detachably mounted.

Solution to Problem

A first aspect of the present invention is a power tool. The power tool includes a battery pack mounting portion capable of selectively attaching and detaching first and second battery packs, wherein the first battery pack comprises a first case, a plurality of first battery cells accommodated in the first case, a first latch portion which locks the first battery pack in the battery pack mounting portion, and a first latch operating portion capable of operating the first latch portion, the first case has a pair of first rail portions for mounting to the battery pack mounting portion, the first rail portions being provided to be spaced apart from each other by a first rail width in a longitudinal direction of the first battery cell, the second battery pack comprises a second case, a plurality of second battery cells accommodated in the second case, a second latch portion which locks the second battery pack in the battery pack mounting portion, and a second latch operating portion capable of operating the second latch portion, the second case has a pair of second rail portions for mounting to the battery pack mounting portion, the second rail portions being provided to be spaced apart from each other by a second rail width in a longitudinal direction of the second battery cell, the first and second cases have different widths at least in the longitudinal direction of the first and second battery cells, and the first and second rail widths are substantially equal to each other, and a center-of-gravity position of the second battery pack is located in the vicinity of the second latch portion or the second latch operating portion in a longitudinal direction of the second rail portion.

Lengths of the first and second rail portions may be substantially equal to each other.

A dimension of the second battery cell in the longitudinal direction may be larger than a dimension of the first battery cell in the longitudinal direction.

A dimension of the second battery cell in a radial direction may be larger than a dimension of the first battery cell in the radial direction.

The second latch portion and the second latch operating portion may be provided on each side surface of the second case on which the second rail portions are provided, and a center-of-gravity position of the second battery pack may be located between the second latch portion and the second latch operating portion in the longitudinal direction of the second rail portion.

The second latch portion and the second latch operating portion may be provided on each side surface of the second case on which the second rail portions are provided, and an outermost surface of the second latch operating portion may be substantially on the same plane as a portion which becomes an outermost surface of the side surface of the second case on which the second latch operating portion is provided, or inward from the portion.

A second aspect of the present invention is a battery pack. The battery pack includes a case, and a plurality of battery cells accommodated in the case, wherein the case has a rail portion for mounting, a latch portion for locking, and a latch operating portion capable of operating the latch portion on both side surfaces thereof, and a center-of-gravity position is located in the vicinity of the latch portion or the latch operating portion in a longitudinal direction of the rail portion. Further, the center-of-gravity position may be located between the latch portion and the latch operating portion in the longitudinal direction of the rail portion.

A third aspect of the present invention is a battery pack. The battery pack includes a case, and a plurality of battery cells accommodated in the case, wherein the case has a rail portion for mounting, a latch portion for locking, and a latch operating portion capable of operating the latch portion on both side surfaces thereof, an outermost surface of the latch operating portion is substantially on the same plane as a portion which becomes an outermost surface of the side surface of the case on which the latch operating portion is provided, or inward from the portion, and a center-of-gravity position is located in the vicinity of the latch portion or the latch operating portion in a longitudinal direction of the rail portion.

A fourth aspect of the present invention is a battery pack. The battery pack includes a plurality of battery cells having 20700 to 21700 sizes, a case which accommodates the plurality of battery cells, a latch portion for locking to a battery pack mounting portion of a power tool, and a latch operating portion capable of operating the latch portion, wherein the case has a pair of rail portions for mounting to the power tool, a center-of-gravity position is located in the vicinity of the latch portion or the latch operating portion in a longitudinal direction of the rail portion, and the battery pack can be attached to and detached from the power tool in place of a predetermined battery pack which accommodates a plurality of battery cells having a 18650 size.

The rail portions may be provided to be spaced apart from each other by a predetermined rail width in a longitudinal direction of the accommodated battery cell, and the rail width may be substantially equal to a rail width of a predetermined battery pack which accommodates the plurality of battery cells having the 18650 size.

A fifth aspect of the present invention is a power tool on which the battery pack of the second to fourth aspects is detachably mounted.

A sixth aspect of the present invention is a battery pack and power tool set including a power tool capable of mounting a first battery pack having a first latch portion, a first rail width and a first case width, and a second battery pack having a second latch portion, a second rail width and a second case width and capable of being mounted on the power tool selectively with the first battery pack, a center-of-gravity position being located in the vicinity of the second latch portion in a longitudinal direction of the rail portion having the second rail width, the second rail width being substantially equal to the first rail width and the second case width being larger than the first case width.

In addition, any combination of the above components, and combinations obtained by conversion between representations of the present invention such as methods or systems are also effective as an aspect of the present invention.

Advantageous Effects of Invention

According to the first, fourth and sixth aspects of the present invention, it is possible to provide a battery pack capable of ensuring compatibility even when dimensions of a built-in battery cell are changed, and a power tool on which the battery pack can be detachably mounted, and a battery pack and power tool set.

According to the second and fifth aspects of the present invention, it is possible to provide a battery pack capable of being easily handled even when a size of the battery pack is increased, and a power tool on which the battery pack can be detachably mounted.

According to the third and fifth aspects of the present invention, it is possible to provide a battery pack capable of minimizing a risk of damage to a latch operating portion as compared with a conventional battery pack due to an increased size of the battery pack, and a power tool on which the battery pack can be detachably mounted.

DESCRIPTION OF EMBODIMENTS

Figure 1:
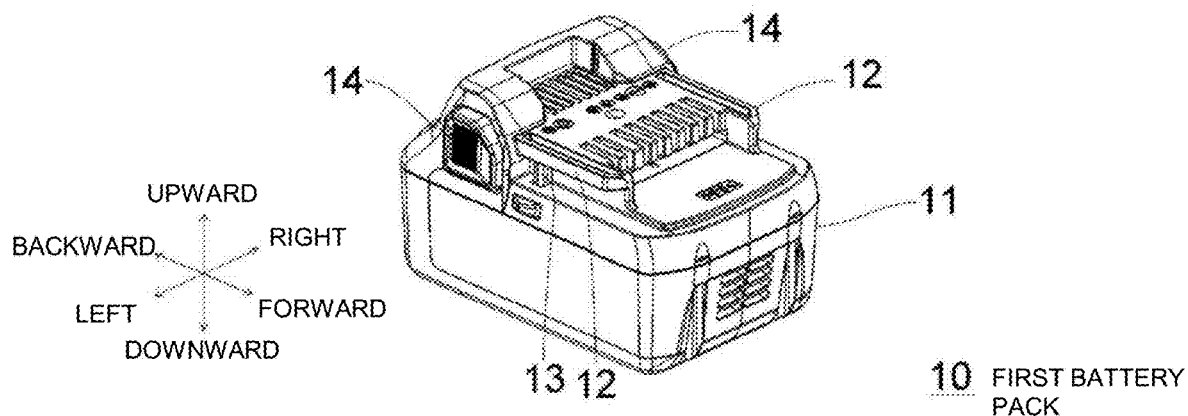
FIG. 1 is a perspective view of a first battery pack 10 in which a plurality of 18650-sized battery cells are accommodated.

Hereinafter, a preferred embodiment of the present invention will be described in detail with reference to the drawings. The same or equivalent elements, members, and so on shown in the respective drawings are designated by the same reference numerals, and redundant description thereof will be omitted as appropriate. In addition, the embodiment does not limit the invention and is an example, and all the features and combinations thereof described in the embodiment are not necessarily essential to the invention.

Figure 3:
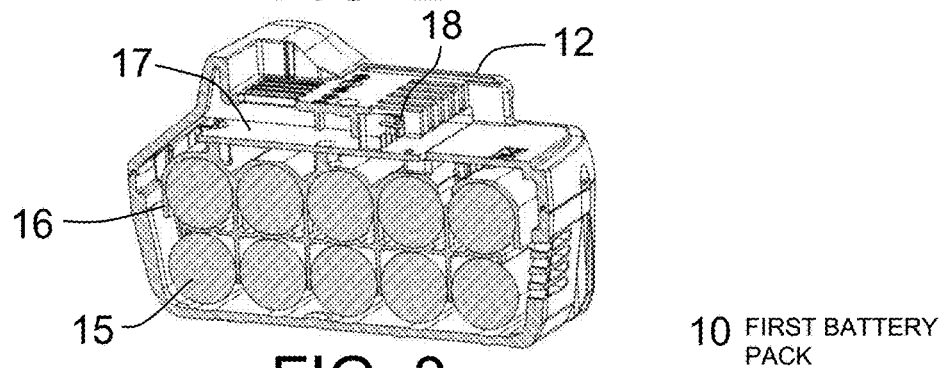
FIG. 3 is a left side cross-sectional view of the first battery pack 10.

A configuration of a first battery pack 10 will be described with reference to FIGS. 1, 3, 5, 7 and 9. In FIG. 1, forward and backward, upward and downward, and left and right directions in the first battery pack 10 are defined. The first battery pack 10 is an example of an existing slide-type battery pack and accommodates a plurality of first battery cells 15 inside a first case 11. As shown in FIG. 3, here, the number of first battery cells 15 is ten. Each of the first battery cells 15 is a secondary battery such as a lithium ion battery having a 18650 size (an outer diameter of 18 mm and a length of 65 mm). As is clear from FIG. 9, the first case 11 is a combination of a first upper case 11a and a first lower case 11b.

As shown in FIG. 3, the first battery cells 15 are held in a predetermined arrangement by a first separator 16 in the first case 11. Specifically, the first battery cells 15 are arranged in the forward and backward direction in two layers×five rows so that the longitudinal direction thereof is the left and right direction (the width direction of the first battery pack 10). In the first case 11, a first substrate 17 is held by the first separator 16 above the first battery cells 15. A predetermined number of first terminals 18 for outputting a voltage of the first battery cells 15 or various signals is provided on the first substrate 17.

Figure 7:
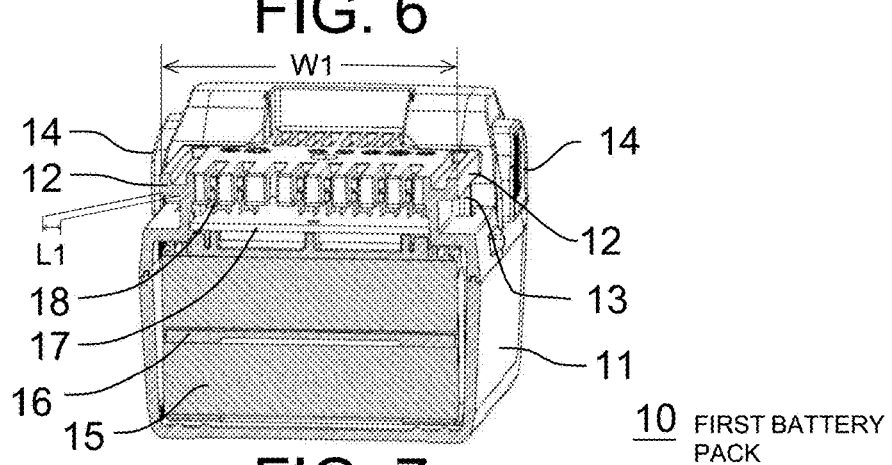
FIG. 7 is a front cross-sectional view of the first battery pack 10 at an intermediate position on a first rail portion 12 in the longitudinal direction.
Figure 11:
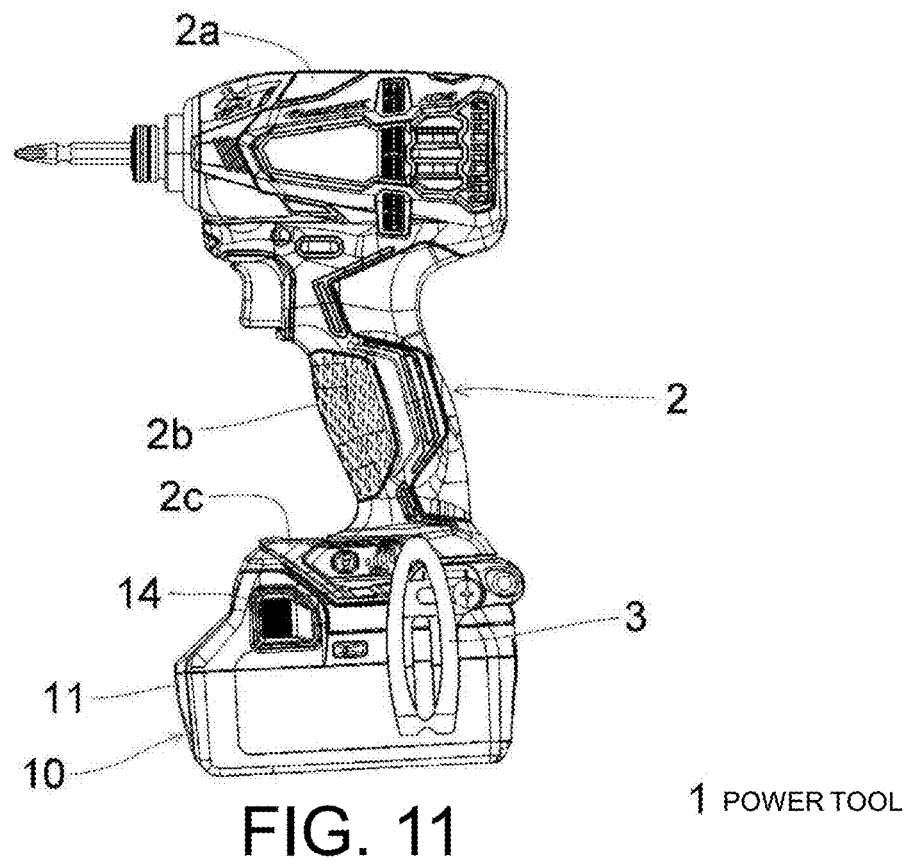
FIG. 11 is a side view of a power tool 1 on which the first battery pack 10 is mounted.
Figure 13:
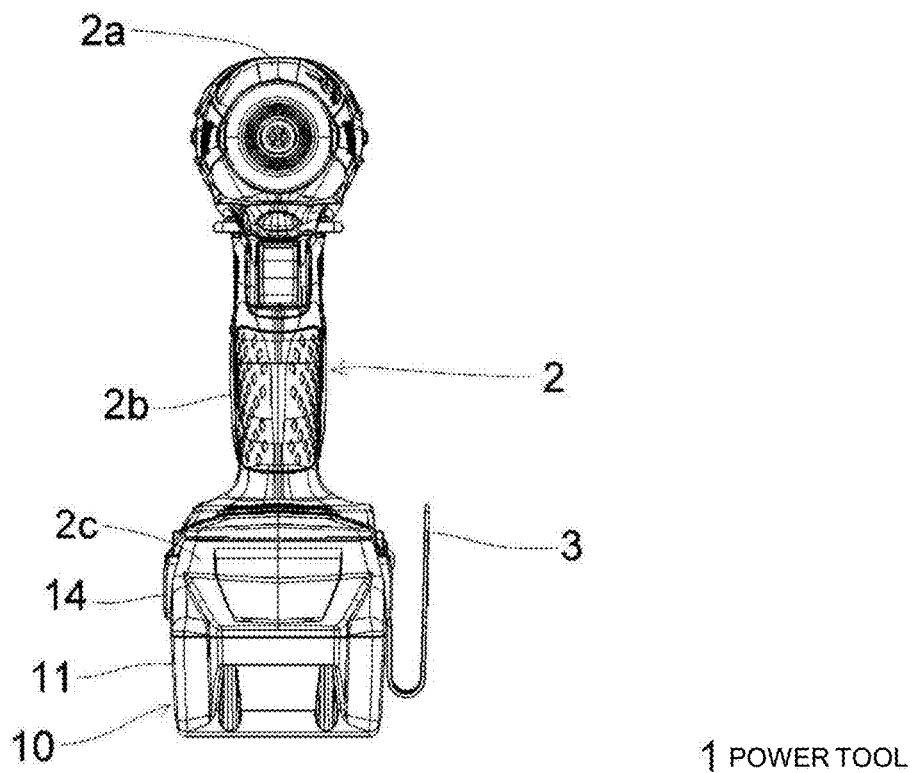
FIG. 13 is a front view of the power tool 1 on which the first battery pack 10 is mounted.

The first case 11 has a pair of first rail portions 12 provided in the left and right direction and spaced apart from each other by a first rail width W1 (FIG. 7). Each of the first rail portions 12 is provided on left and right side surfaces of the first case 11 with a protruding length of L1 shown in FIG. 7 and extends in the forward and backward direction. The first rail portion 12 is used as a guide when the first battery pack 10 is slidably mounted to the power tool 1 as shown in FIGS. 11 and 13. In FIG. 11, the first battery pack 10 is slidably mounted to the power tool 1 from the left side toward the right side.

A first latch portion 13 for locking the first battery pack 10 in a battery pack mounting portion 2c of the power tool 1 as shown in FIGS. 11 and 13, and a first latch operating portion 14 capable of operating the first latch portion 13 are provided on each of the left and right side surfaces of the first case 11. The first latch portion 13 is biased to protrude from the side surface of the first case 11. When the first battery pack 10 is detached from the power tool 1, a user pushes the first latch operating portion 14 to retract the first latch portion 13 into the side surface of the first case 11, thereby releasing the locking due to the first latch portion 13.

When ten first battery cells 15 are connected in series in the first battery pack 10, a rated output voltage is 36 V, a continuous output current is about 20 A, and a total cell volume is about 170,000 mm$^3$. Here, when the continuous output current is made 28 A or more with the rated output voltage remaining at 36 V, twenty first battery cells 15 (ten serial connections in parallel in two rows) are necessary, and the total cell volume is about 340,000 mm$^3$.

Figure 2:
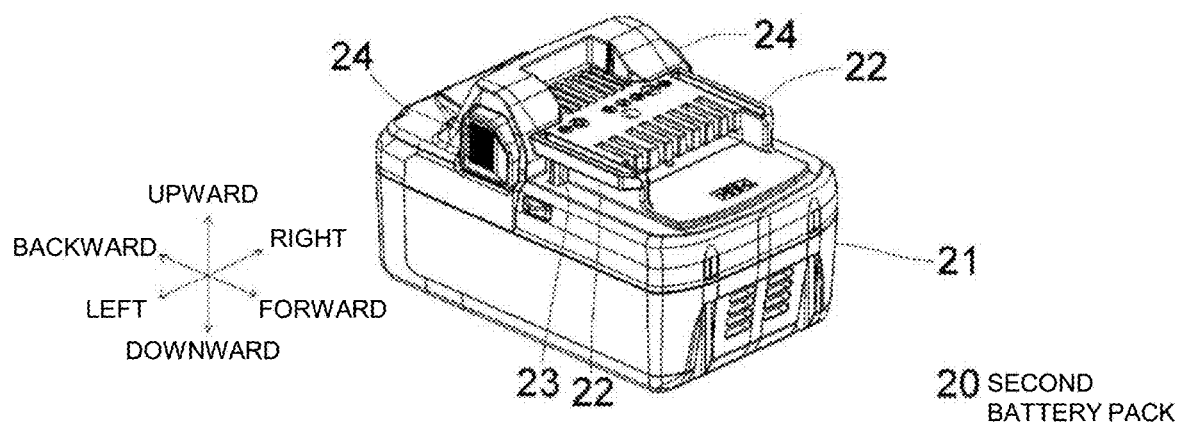
FIG. 2 is a perspective view of a second battery pack 20 in which a plurality of battery cells having 20700 to 21700 sizes are accommodated according to an embodiment of the present invention.
Figure 4:
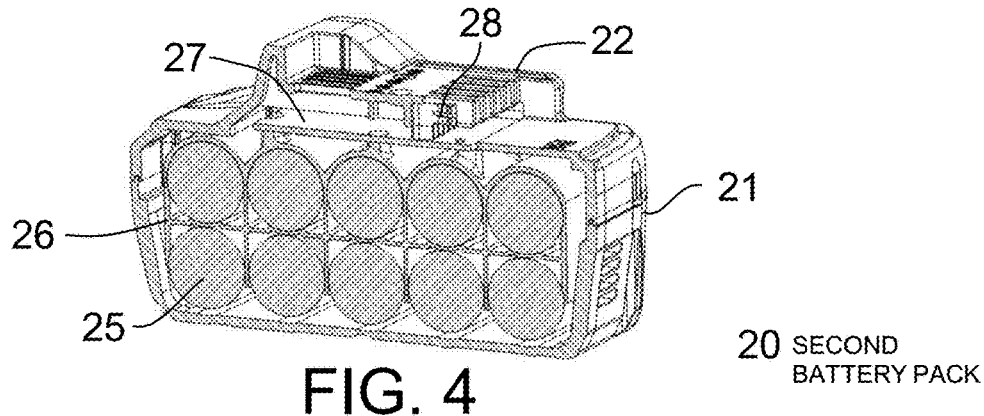
FIG. 4 is a left side cross-sectional view of the second battery pack 20.
Figure 5:
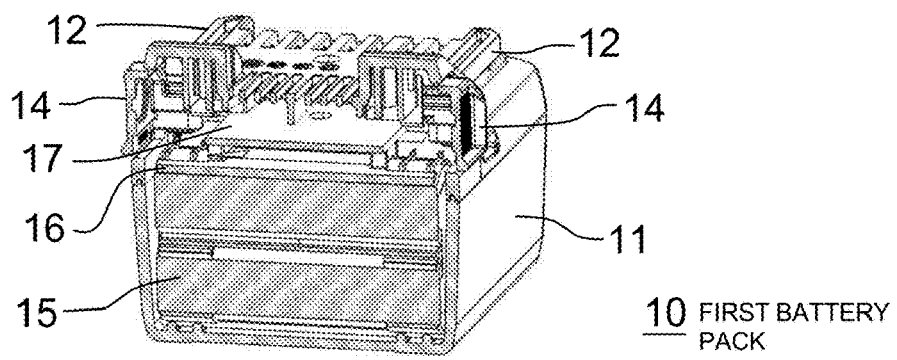
FIG. 5 is a back cross-sectional view of the first battery pack 10 at a position of a first latch operating portion 14.

Subsequently, a configuration of a second battery pack 20 will be described with reference to FIGS. 2, 4, 6, 8 and 10. In FIG. 2, forward and backward, upward and downward, and left and right directions in the second battery pack 20 are defined. The second battery pack 20 is an example of a slide-type battery pack according to the embodiment of the present invention and can be attached to and detached from the power tool 1 in place of the first battery pack 10. The second battery pack 20 accommodates a plurality of second battery cells 25 inside a second case 21. As shown in FIG. 4, here, the number of second battery cells 25 is ten. Each of the second battery cells 25 is a secondary battery such as a lithium ion battery having a 20700 size (an outer diameter of 20 mm and a length of 70 mm) to a 21700 size (an outer diameter of 21 mm and a length of 70 mm). Therefore, a dimension of the second battery cell 25 in the radial direction is larger and a dimension thereof in the longitudinal direction is also larger than those of the first battery cell 15. In the illustrated example, the second battery cell 25 has a 21700 size. As is clear from FIG. 10, the second case 21 is a combination of a second upper case 21a and a second lower case 21b. As is clear from FIGS. 1 to 4, a length of the second case 21 in the forward and backward direction is longer than that of the first case 11. Further, as is clear from FIGS. 5 to 8, a width of the second case 21 in the left and right direction is larger than that of the first case 11.

As shown in FIG. 4, the second battery cell 25 is held in a predetermined arrangement by a second separator 26 in the second case 21. Specifically, the second battery cells 25 are arranged in the forward and backward direction in two layers×five rows so that the longitudinal direction thereof is the left and right direction (the width direction of the second battery pack 20). In the second case 21, a second substrate 27 is held by the second separator 26 above the second battery cells 25. A predetermined number of second terminals 28 for outputting a voltage of the second battery cells 25 or various signals is provided on the second substrate 27.

Figure 8:
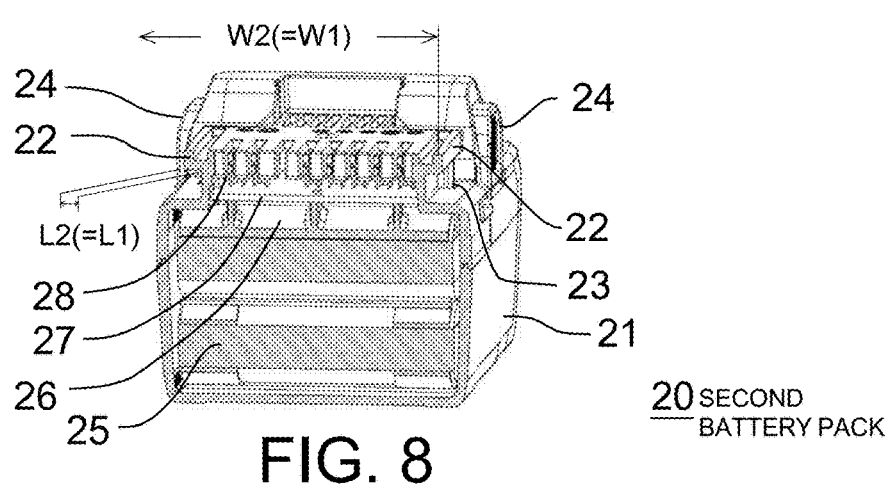
FIG. 8 is a front cross-sectional view of the second battery pack 20 at an intermediate position on a second rail portion 22 in the longitudinal direction.
Figure 9:
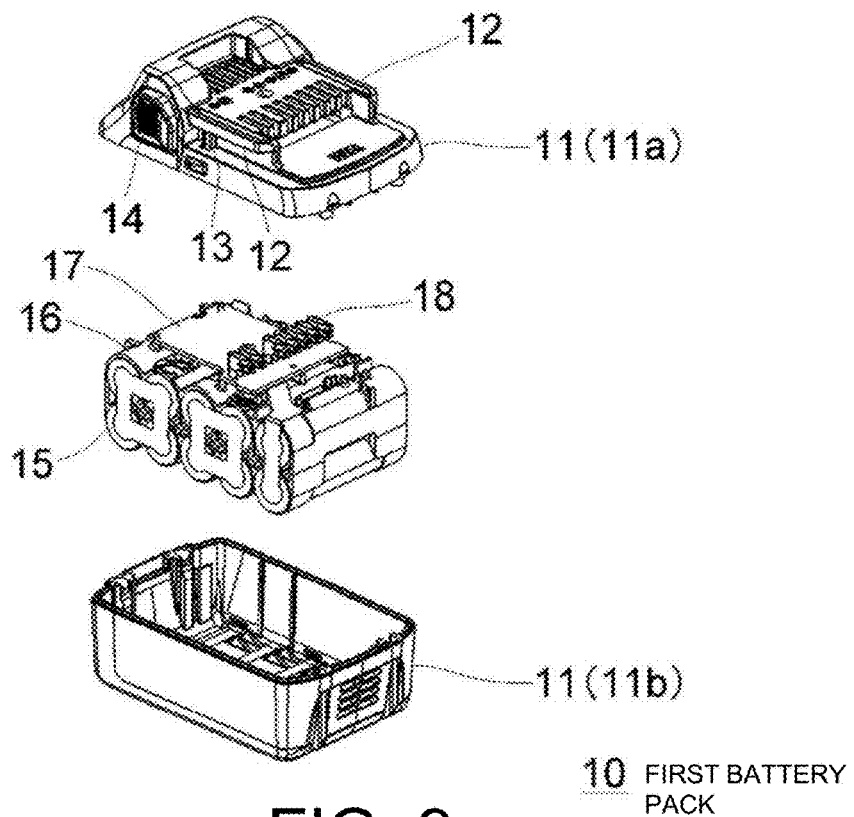
FIG. 9 is an exploded perspective view of the first battery pack 10.
Figure 10:
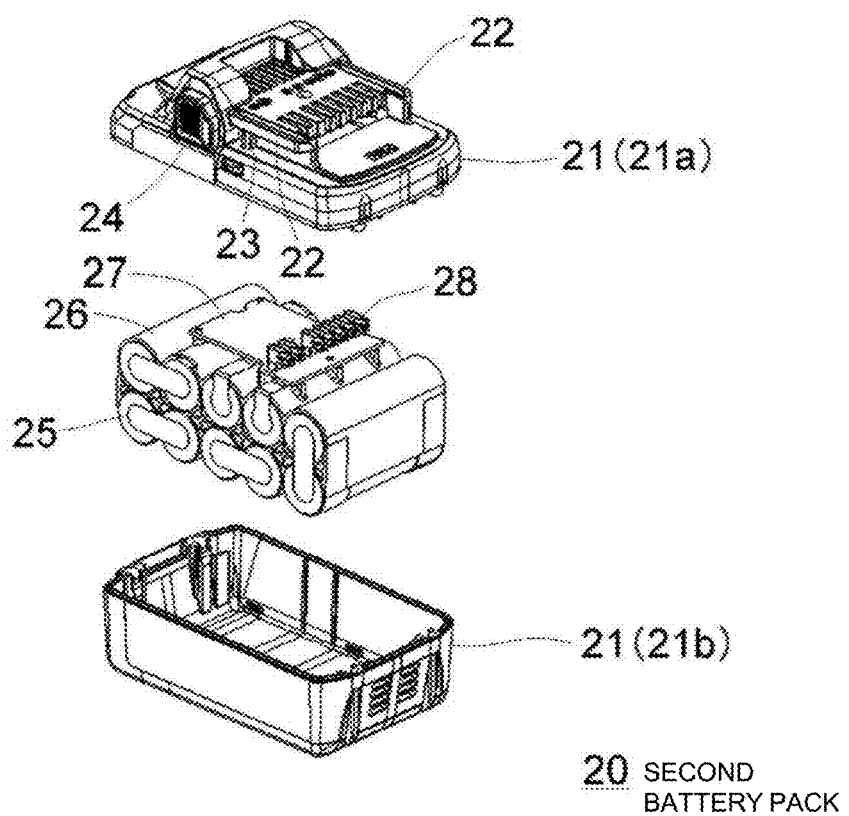
FIG. 10 is an exploded perspective view of the second battery pack 20.
Figure 12:
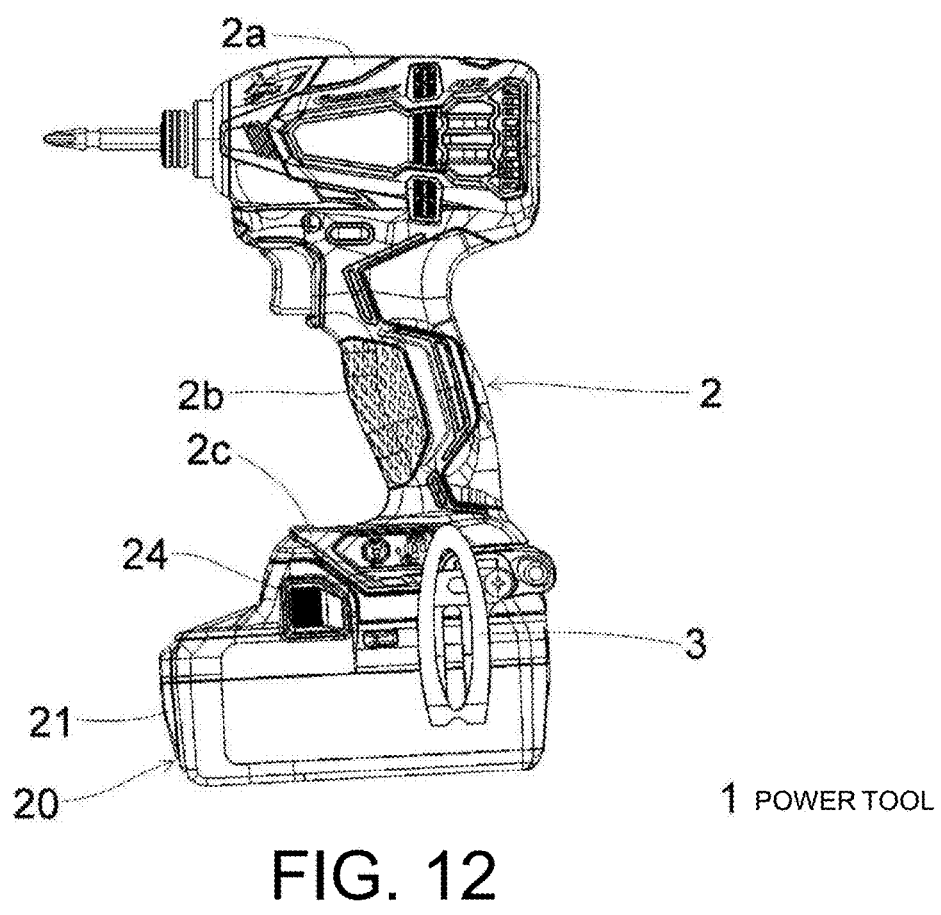
FIG. 12 is a side view of the power tool 1 on which the second battery pack 20 is mounted.
Figure 14:
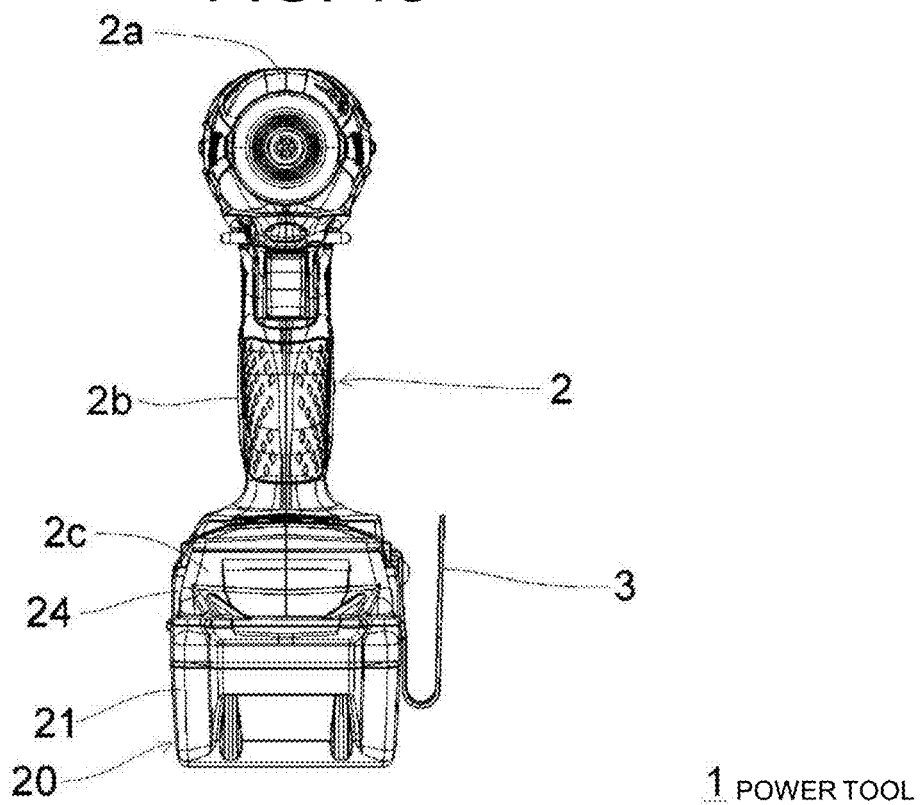
FIG. 14 is a front view of the power tool 1 on which the second battery pack 20 is mounted.

The second case 21 has a pair of second rail portions 22 provided in the left and right direction to be spaced apart from each other by a second rail width W2 (FIG. 8). The second rail width W2 is substantially equal to the first rail width W1 of the first battery pack 10 shown in FIG. 7. Each of the second rail portions 22 is provided on left and right side surfaces of the second case 21 with a protruding length of L2 shown in FIG. 8 and extends in the forward and backward direction. The protruding length L2 of the second rail portion 22 from the side surface of the second case 21 is substantially equal to the protruding length L1 of the first rail portion 12 from the side surface of the first case 11 shown in FIG. 7. Further, a length of the second rail portion 22 is substantially equal to that of the first rail portion 12. The second rail portion 22 is used as a guide when the second battery pack 20 is slidably mounted to the power tool 1 as shown in FIGS. 12 and 14. In FIG. 12, the second battery pack 20 is slidably mounted to the power tool 1 from the left side toward the right side.

Figure 6:
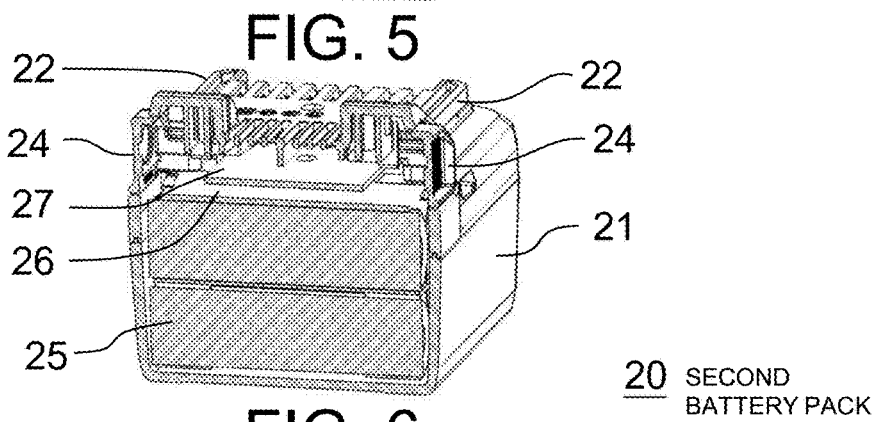
FIG. 6 is a back cross-sectional view of the second battery pack 20 at a position of a second latch operating portion 24.

A second latch portion 23 for locking the second battery pack 20 in the battery pack mounting portion 2c of the power tool 1 as shown in FIGS. 12 and 14, and a second latch operating portion 24 capable of operating the second latch portion 23 are provided on each of the left and right side surfaces of the second case 21. A center-of-gravity position of the second battery pack 20 is located between the second latch portion 23 and the second latch operating portion 24 in the longitudinal direction of the second rail portion 22, that is, in the forward and backward direction. Further, as shown in FIG. 6, an outermost surface of the second latch operating portion 24 is located substantially on the same plane as a portion which becomes an outermost surface of the side surface of the second case 21 on which the second latch operating portion 24 is provided, or inward from the portion. The second latch portion 23 is biased to protrude from the side surface of the second case 21. When the second battery pack 20 is detached from the power tool 1, the user pushes the second latch operating portion 24 to retract the second latch portion 23 into the side surface of the second case 21, thereby releasing the locking due to the second latch portion 23.

When ten second battery cells 25 having a 20700 size are connected in series in the second battery pack 20, the rated output voltage is 36 V, the continuous output current is about 30 A, and the total cell volume is about 220,000 mm$^3$. Further, when ten second battery cells 25 having a 21700 size are connected in series in the second battery pack 20, the rated output voltage is 36 V, the continuous output current is about 35 A, and the total cell volume is about 250,000 mm$^3$.

Figure 15:
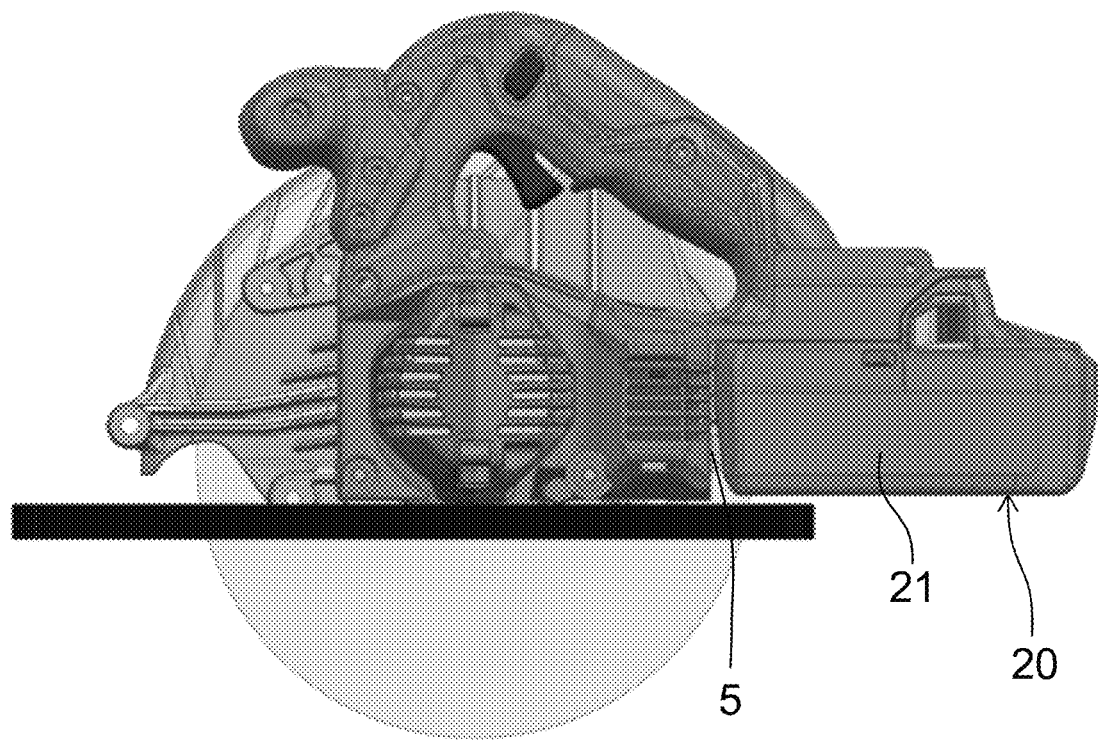
FIG. 15 is a side view of a power tool 1' (a portable cutting machine) on which the second battery pack 20 is mounted.

As shown in FIGS. 11 to 14, a housing 2 of the power tool 1 includes a cylindrical portion 2a which accommodates a motor (not shown), a handle portion 2b which extends downward from an intermediate portion of the cylindrical portion 2a, and the battery pack mounting portion 2c provided at a lower end of the handle portion 2b. The first battery pack 10 and the second battery pack 20 can be selectively attached to and detachable from the battery pack mounting portion 2c. A hook 3 for hooking the power tool 1 on a wall surface or the like is provided on battery pack mounting portion 2c. The power tool 1 is not limited to an electric screwdriver having a T-shaped housing or the like and may be another type such as a portable cutting machine. As described above, the length of the second case 21 of the second battery pack 20 in the forward and backward direction is longer than that of the first case 11 of the first battery pack 10, but the length from a top end of the second rail portion 22 to a top end of the second case 21 is substantially equal to the length from a top end of the first rail portion 12 to a top end of the first case 11, and the second case 21 on the rear side of the second latch operating portion 24 is longer than the first case 11 on the rear side of the first latch operating portion 14. That is, a dimension on the rear side in the slide mounting direction is increased. Therefore, even in the case of a power tool having a wall 5 such as a housing on the slide mounting direction side of the battery pack, like a portable cutting machine 1' shown in FIG. 15, it is possible to mount the second battery pack 20 of which a dimension in the forward and backward direction is longer than that of the first battery pack 10.

According to the embodiment, the following effects can be obtained.

(1) Since the first rail width W1 of the first battery pack 10 and the second rail width W2 of the second battery pack 20 are substantially equal to each other, a new high power type second battery pack 20 can be mounted to the power tool 1 on which the existing first battery pack 10 can be mounted (compatibility can be secured). Therefore, when the first battery pack 10 is switched to the second battery pack 20, the user does not need to newly prepare the power tool corresponding to the second battery pack 20, and thus a burden on the user is small.

(2) The size of the second battery pack 20 is larger than that of the first battery pack 10, but since the center-of-gravity position is located between the second latch portion 23 and the second latch operating portion 24 in the forward and backward direction, handling is easy. That is, it is possible to minimize difficulty in handling due to the second battery pack 20 having a larger size than that of the first battery pack 10.

(3) In the second battery pack 20, since the outermost surface of the second latch operating portion 24 is located substantially on the same plane as the portion which becomes the outermost surface of the side surface of the second case 21 on which the second latch operating portion 24 is provided, or inward from the portion, damage to the second latch operating portion 24 can be minimized in a case in which the second battery pack 20 falls, or the like.

(4) When the rated output voltage is set to 36 V and the continuous output current is set to 28 A or more using the 18650-sized first battery cell 15, it is necessary to set the number of the first battery cells 15 to 20, and the total cell volume becomes as large as about 340,000 mm$^3$, but while the total cell volume of the second battery pack 20 is as relatively small as 300,000 mm$^3$, a high output with the rated output voltage of 36 V and the continuous output current of 28 A or more can be realized.

Although the present invention has been described with reference to the embodiment, it is understood by those skilled in the art that various modifications can be made to each element and each processing process of the embodiment within the range described in the claims.

The invention claimed is:

1. A power tool comprising:
   a battery pack mounting portion capable of selectively attaching and detaching first and second battery packs,
   wherein the first battery pack comprises a first case, a plurality of first battery cells accommodated in the first case, a first latch portion which locks the first battery pack in the battery pack mounting portion, and a first latch operating portion capable of operating the first latch portion,
   the first case has a pair of first rail portions for mounting to the battery pack mounting portion, the first rail portions being provided to be spaced apart from each other by a first rail width in a longitudinal direction of the first battery cell,
   the second battery pack comprises a second case, a plurality of second battery cells accommodated in the second case, a second latch portion which locks the second battery pack in the battery pack mounting portion, and a second latch operating portion capable of operating the second latch portion,
   the second case has a pair of second rail portions for mounting to the battery pack mounting portion, the second rail portions being provided to be spaced apart from each other by a second rail width in a longitudinal direction of the second battery cell, and
   the first and second cases have different widths at least in the longitudinal direction of the first and second battery cells, and the first and second rail widths are substantially equal to each other,
   wherein the second latch portion and the second latch operating portion are provided on two side surfaces of the second case on which the second rail portions are provided, and
   a center-of-gravity position of the second battery pack is located between the second latch portion and the second latch operating portion in the longitudinal direction of the second rail portion.

2. The power tool according to claim 1, wherein a dimension of the second battery cell in the longitudinal direction is larger than a dimension of the first battery cell in the longitudinal direction.

3. The power tool according to claim 2, wherein a dimension of the second battery cell in a radial direction is larger than a dimension of the first battery cell in the radial direction.

4. The power tool according to claim 1, wherein lengths of the first and second rail portions are substantially equal to each other.

5. The power tool according to claim 2, wherein the second latch portion and the second latch operating portion are provided on two side surfaces of the second case on which the second rail portions are provided, and
   an outermost surface of the second latch operating portion is substantially on the same plane as a portion which becomes an outermost surface of the side surface of the second case on which the second latch operating portion is provided, or inward from the portion.

6. A battery pack comprising:
   a case; and
   a plurality of battery cells accommodated in the case,
   wherein the case has a rail portion for mounting, a latch portion for locking, and a latch operating portion capable of operating the latch portion on both side surfaces thereof, and a center-of-gravity position of the battery pack is located between the latch portion and the latch operating portion in a longitudinal direction of the rail portion.

7. The battery pack according to claim 6, wherein
an outermost surface of the latch operating portion is substantially on the same plane as a portion which becomes an outermost surface of the side surface of the case on which the latch operating portion is provided, or inward from the portion.

8. The battery pack according to claim 6, wherein the plurality of battery cells having 20700 to 21700 sizes, and
wherein the battery pack can be attached to and detached from the power tool in place of a predetermined battery pack which accommodates a plurality of battery cells having a 18650 size.

9. The battery pack according to claim 8, wherein the rail portions are provided to be spaced apart from each other by a predetermined rail width in a longitudinal direction of the accommodated battery cell, and
the rail width is substantially equal to a rail width of a predetermined battery pack which accommodates the plurality of battery cells having the 18650 size.

10. A power tool on which the battery pack according to claim 6 is detachably mounted.

11. A battery pack and power tool set comprising:
the power tool having a battery pack mounting portion capable of mounting the battery pack, and
the battery pack having a latch portion for locking to the battery pack mounting portion, a latch operating portion for operating the latch portion, and a rail portion for guiding to the battery pack mounting portion, a center-of-gravity position of the battery pack being located between the latch portion and the latch operating portion in a longitudinal direction of the rail portion.

12. The battery pack according to claim 6, wherein
the plurality of battery cells includes five battery cells, and
each of the battery cells is disposed such that a radial direction of each of the battery cells is aligned with a longitudinal direction of the rail portion, and
in the longitudinal direction of the rail portion, the center-of-gravity position of the battery pack is located at a region of a middle battery cell of the five battery cells that are aligned with the longitudinal direction of the rail portion.

13. The battery pack according to claim 11, wherein
the plurality of battery cells includes five battery cells, and
each of the battery cells is disposed such that a radial direction of each of the battery cells is aligned with a longitudinal direction of the rail portion, and
in the longitudinal direction of the rail portion, the center-of-gravity position of the battery pack is located at a region of a middle battery cell of the five battery cells that are aligned with the longitudinal direction of the rail portion.

* * * * *